US009729902B2

(12) United States Patent
Rothschild et al.

(10) Patent No.: US 9,729,902 B2
(45) Date of Patent: Aug. 8, 2017

(54) SYSTEM AND METHOD FOR PROVIDING SESSION BASED ENCRYPTION FROM A VIDEO PUMP

(75) Inventors: Keith Alan Rothschild, Dunwoody, GA (US); Robert Lee Ames, Jr., Kennesaw, GA (US); Julius Bert Bagley, Lawrenceville, GA (US)

(73) Assignee: Cox Communications, Inc., Atlanta, GA (US)

( * ) Notice: Subject to any disclaimer, the term of this patent is extended or adjusted under 35 U.S.C. 154(b) by 340 days.

(21) Appl. No.: 12/985,458

(22) Filed: Jan. 6, 2011

(65) Prior Publication Data

US 2012/0180082 A1 Jul. 12, 2012

(51) Int. Cl.

| | | |
|---|---|---|
| H04N 7/167 | (2011.01) | |
| H04N 7/173 | (2011.01) | |
| H04N 21/2347 | (2011.01) | |
| H04N 21/222 | (2011.01) | |
| H04N 21/238 | (2011.01) | |
| H04N 21/2383 | (2011.01) | |
| H04N 21/24 | (2011.01) | |
| H04N 21/266 | (2011.01) | |
| H04N 21/472 | (2011.01) | |
| H04N 21/61 | (2011.01) | |
| H04N 21/6334 | (2011.01) | |

(52) U.S. Cl.
CPC ..... *H04N 21/2347* (2013.01); *H04N 21/2221* (2013.01); *H04N 21/2383* (2013.01); *H04N 21/23805* (2013.01); *H04N 21/2404* (2013.01); *H04N 21/26613* (2013.01); *H04N 21/47202* (2013.01); *H04N 21/6118* (2013.01); *H04N 21/6168* (2013.01); *H04N 21/63345* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,681,326 | B2* | 1/2004 | Son et al. | 713/150 |
| 7,720,754 | B1* | 5/2010 | Gutierrez-Sheris | 705/39 |
| 7,970,132 | B2* | 6/2011 | Fahrny et al. | 380/42 |
| 2002/0184637 | A1* | 12/2002 | Perlman | 725/87 |
| 2005/0005286 | A1* | 1/2005 | Koskela et al. | 725/31 |
| 2006/0085821 | A9* | 4/2006 | Simmons et al. | 725/61 |
| 2007/0277219 | A1* | 11/2007 | Toebes et al. | 725/139 |
| 2008/0060031 | A1* | 3/2008 | Sekigawa | 725/103 |
| 2011/0075841 | A1* | 3/2011 | Chen et al. | 380/200 |
| 2011/0131619 | A1* | 6/2011 | Hasek et al. | 725/93 |

* cited by examiner

*Primary Examiner* — Nasser Goodarzi
*Assistant Examiner* — Fred Peng
(74) *Attorney, Agent, or Firm* — Merchant & Gould, P.C.

(57) ABSTRACT

A system includes a session and resource manager and a video pump. The session and resource manager negotiates encryption keys from a headend controller and provides the encryption keys to a video pump. The video pump uses the encryption keys from the session and resource manager to encrypt content. Thus, the video pump uses encryption keys to encrypt the content so that it is encrypted right from the video pump prior to transmission over the entire transport system. A generic modulation device may thus be used to modulate the encrypted content over the delivery network.

25 Claims, 6 Drawing Sheets

SYSTEM AND METHOD FOR PROVIDING SESSION BASED ENCRYPTION FROM A VIDEO PUMP

FIELD OF THE INVENTION

This disclosure relates in general to securely providing content to users in a network, and more particularly to a system and method for providing session based encrypted content from a video pump.

BACKGROUND

The Video-on-Demand (VOD) pump acts as a video streaming server. It is configured with a processor and a large storage medium, such as a hard disk drive system. The hard disk drive system may be an array of hard drives, which provide content to the processor at a very high bandwidth. The VOD pump may thus be part of a system of servers.

Currently, content that is coming out of the VOD pump is not encrypted. Generally, the content is provided by a private network, e.g., the content is provided by a cable provider from the network of the cable provider. The network provider exerts control over that network and usually the VOD pump is disposed within a controlled facility. Thus, historically, network providers have not been terribly concerned about the security of the content.

Content providers today, however, are becoming increasingly concerned about the protection of the content that they create. Thus, having the content streaming over a network where somebody could be listening to and/or recording the content is a concern. Obviously, transmitting the content in the clear further down all the way to the subscriber is also a concern. That is the way VOD content was provided to the subscribers for many years because a special application was needed to even identify where the content was. Thus, there was not much concern about someone stealing the content. However, as QAM televisions and QAM tuners for computers began to enter the market, there was increasing concern for providing secure or encrypted content.

Because of the complexity associated with encryption and video pump functions, provisioning encryption capabilities in a video pump has been avoided. As described above, such encryption has always been place further down the delivery path. However, the advancement of capabilities for televisions and tuners and competition among service providers, makes encrypting content at the QAMs too expensive and creates unacceptable risk for high-value content in an unencrypted format. Moreover, as video pumps have been placed further away from the edge, greater access to unencrypted content is subjected to access by a greater number of people.

Accordingly, there is a need for a system and method for providing session based encryption from a video pump.

SUMMARY OF THE INVENTION

To overcome the limitations described above, and to overcome other limitations that will become apparent upon reading and understanding the present specification, embodiments for a system and method for providing session based encryption from a video pump are disclosed.

The above-described problems are solved by enabling the VOD pump to be able to encrypt content requested by a set-top box. A VOD pump uses encryption keys to encrypt the content so that it is encrypted right from the pump over the entire transport system. The edge device no longer needs to have an encryption capable edge device.

An embodiment includes session and resource manager. The session and resource manager includes memory for storing data and a processor, coupled to the memory; for processing data, wherein the processor is configured to obtain from a headend controller encryption keys utilized for encrypting content requested by a set-top box.

In another embodiment a video pump is disclosed. The video pump includes memory for storing content and a processor, coupled to the memory; for processing data, wherein the processor is configured to receive encryption keys associated with a video session and to encrypt content associated with the video session using the received encryption keys.

In another embodiment, a system for providing session based encrypted content from a video pump is disclosed. The system includes a headend controller for receiving a request from a set-top box via a hybrid fiber coax (HFC) network for establishing a video session for delivering requested content, the headend controller managing data sent to and received from the set-top box via the HFC network, a session and resource manager, coupled to the headend controller, for obtaining encryption keys from the headend controller, the encryption keys utilized for encrypting content requested by the set-top box, a video pump, coupled to the session and resource manager, for receiving the obtained encryption keys associated with a video session and for encrypting the requested content associated with the video session using the received encryption keys and a generic modulation device, for receiving the encrypted content from the video pump and for modulating the encrypted content for delivery to the set-top box via the HFC network.

In another embodiment, a method for providing session based encrypted content from a video pump is disclosed. The method includes communicating, by a session and resource manager with at least one of a plurality of headend controllers, to obtain encryption keys for content requested by a set-top box, forwarding, to a video pump, the obtained encryption keys for the content requested by the set-top box and providing, to the video pump, an instruction for the video pump to obtain the requested content, to encrypt the requested content using the obtained encryption keys provided by the session and resource manager, and to stream the content encrypted using the obtained encryption keys from the session and resource manager to a set-top box requesting the content.

In another embodiment, a computer readable medium is provided. The computer readable medium includes executable instructions which, when executed by a processor, provides session based encrypted content from a video pump, by communicating, by a session and resource manager with at least one of a plurality of headend controllers, to obtain encryption keys for content requested by a set-top box, forwarding, to a video pump, the obtained encryption keys for the content requested by the set-top box and providing, to the video pump, an instruction for the video pump to obtain the requested content, to encrypt the requested content using the obtained encryption keys provided by the session and resource manager, and to stream the content encrypted using the obtained encryption keys from the session and resource manager to a set-top box requesting the content.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments of the present invention are directed to a system and method for providing session based encrypted content from a video pump. A system according to one embodiment includes a session and resource manager, a video pump and a modulation device. The session and resource manager negotiates encryption keys from a head-end controller and provides the encryption keys to a video pump. The video pump uses the encryption keys from the session and resource manager to encrypt content. Thus, the video pump uses encryption keys to encrypt the content so that it is encrypted right from the video pump prior to transmission over the entire transport system. A generic modulation device may thus be used to modulate the encrypted content over the delivery network.

Figure 1:
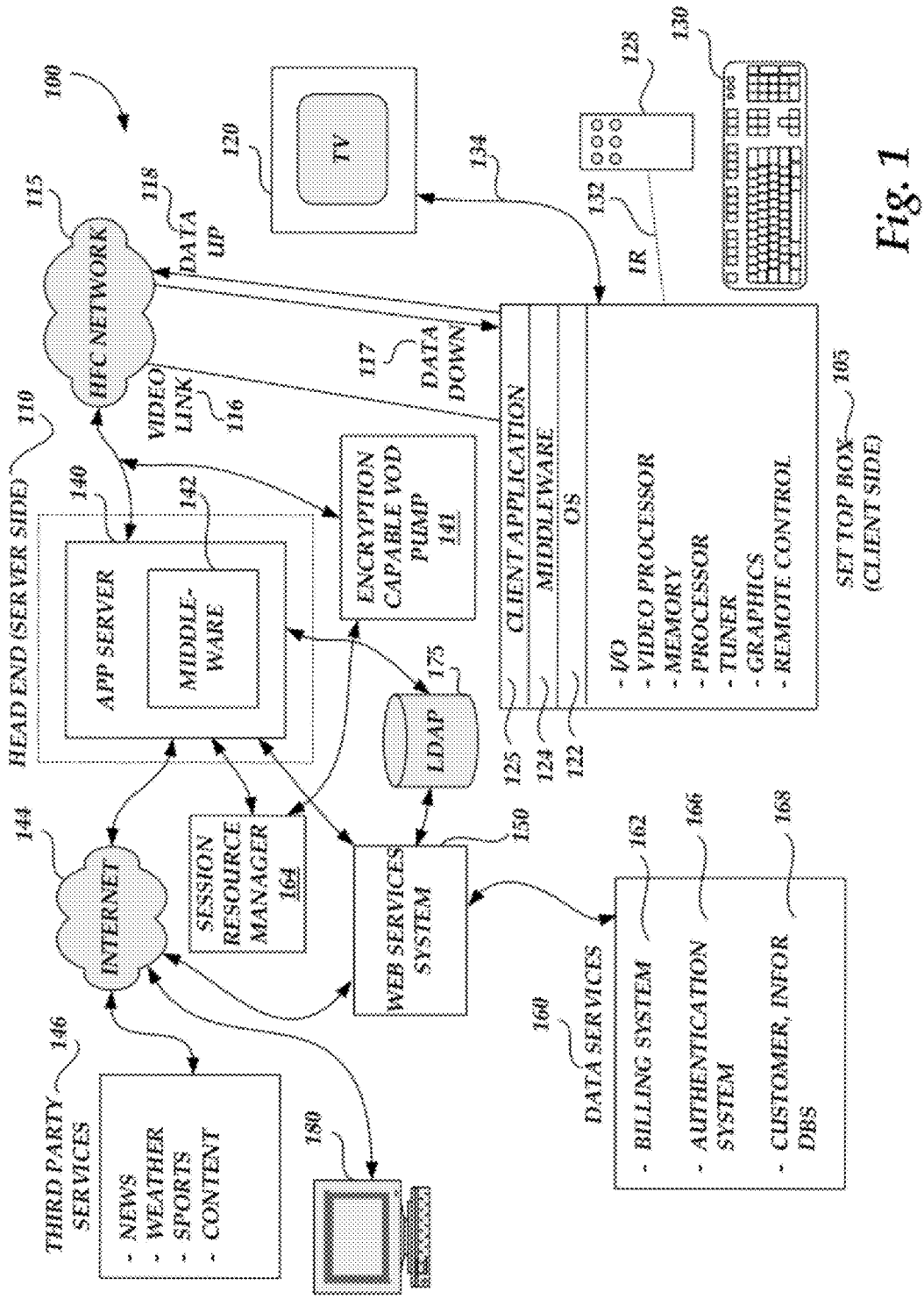
FIG. 1 is a simplified block diagram illustrating a cable television/services system (hereafter referred to as "CATV") architecture that serves as an example of one operating environment.

FIG. 1 is a simplified block diagram illustrating a cable television/services system 100 (hereafter referred to as "CATV") architecture that serves as an exemplary operating environment for the present invention. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modern CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The STB 105 also includes a video processor for processing and providing digital and analog video signaling to the television set 120 via a communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash to the television 120 at the direction of the client application 125 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment of the present invention, the middleware layer 124 may include a set of application programming interfaces (API) that are exposed to client applications 125 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. According to one embodiment of the present invention, the middleware layer 142 of the server-side application server and the middleware layer 124 of the client-side STB 105 format data passed between the client side and server side. For example, the Extensible Markup Language (XML) may be used to format such data.

The set-top box 105 passes digital and analog video and data signaling to the television 120 via a communication transport 134. The STB 105 may receive video from the server side of the CATV system 100 via the HFC network 115 through a video link 116 and data via a data downlink 117 and data uplink 118. The STB 105 may transmit data from the client side of the CATV system 100 to the server side of the CATV system 100 via the HFC network 115 and the data uplink 118. The video link is an "in band" link that allows for delivery of digital and analog video from the server side of the CATV system 100 through the HFC network 115 to the set-top box 105 for use by the STB 105 and for distribution to the television set 120. As is understood by those skilled in the art, the "in band" signaling space operates in a first frequency range, which may be divided into channels in which analog or digital signals may be transmitted.

The data uplink 118, illustrated in FIG. 1, between the HFC network 115 and the set-top box 105 comprise "out of band" data links. As is understand by those skilled in the art, the "out of band" data uplink operates in a second frequency range, which is different from the first frequency range used by the "in band" signaling. The data downlink may be an "in band" signal. However, those skilled in the art will recognize that the data downlink may be provided by "out of band" signaling also. According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 140 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105.

According to one embodiment of the present invention, data obtained and managed by the middleware layer 142 of the application server 140 may be formatted according to the Extensible Markup Language and passed to the set-top box 105 through the HFC network 115 where the XML-formatted data may be utilized by a client application 125 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments of the present invention, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments of the present invention, the billing system 162 may also include billing data for services and products subscribed to by the customer for bill processing billing presentment and payment receipt.

A customer information database 168 may include general information about customers such as place of employment, business address, business telephone number and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

A session and resource manager 164 provides session based encryption for a video pump 141. The set-top box 105 communicates with the session and resource manager 164 to set up a VOD session. The session and resource manager 164 negotiates keys for encrypting content. The session and resource manager communicates with the headend controller 110 to obtain encryption keys. The session and resource manager 164 then communicates with the VOD pump 141 to provide the encryption keys and to instruct the VOD pump to stream selected content and metadata to the subscriber after decryption using the encryption keys. The encryption capable VOD pump 141 performs the encryption and streams the content and metadata out to the target set-top box 105.

An authentication system 166 may include information such as secure user names and passwords utilized by customers for access to network services. As should be understood by those skilled in the art, the disparate services systems 162, 164, 166, 168 are illustrated as a collection of services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments of the present invention, the web services system 150 serves as a collection point for data requested from each of the disparate data services systems comprising the data services 160. According to embodiments of the present invention, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 may be operative to communicate with each of the disparate data services systems for obtaining necessary customer data. The customer data obtained by the web services system is assembled and is returned to the application server 140 for ultimate processing via the middleware layer 142, as described above.

Figure 2:
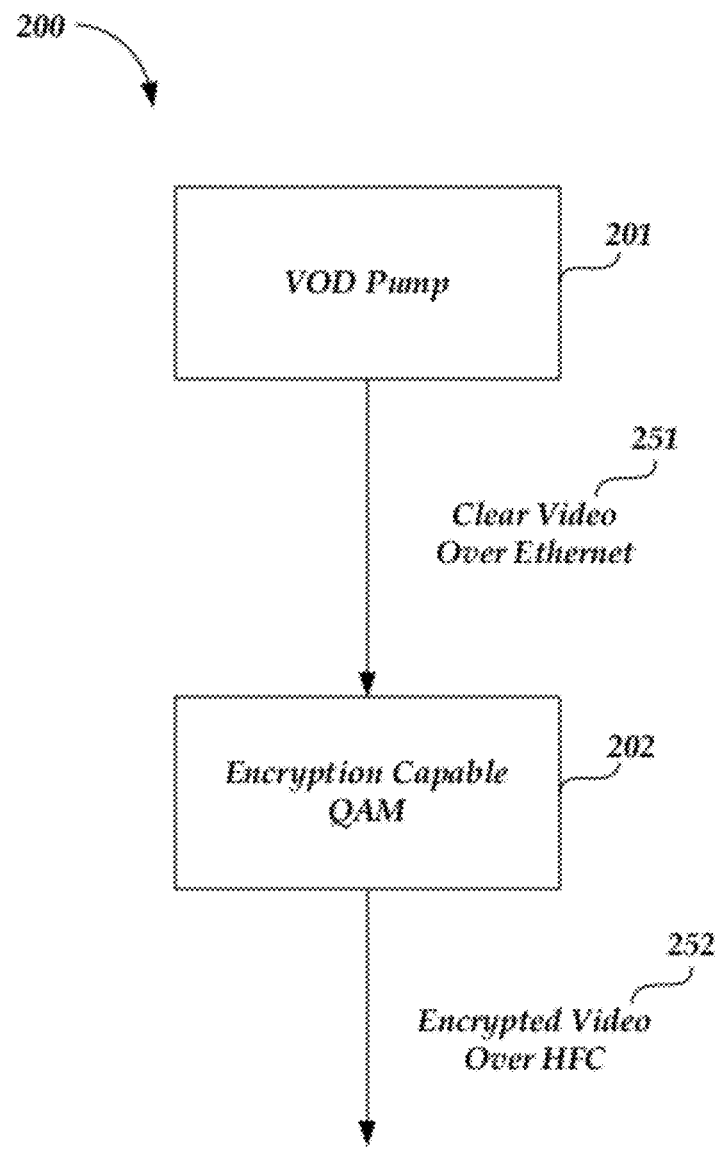
FIG. 2 illustrates the Encryption Capable QAM being used to encrypt the video content from the VOD Pump in accordance with the prior art.

FIG. 2 illustrates the Encryption Capable QAM being used to encrypt the video content from the VOD Pump 200 in accordance with the prior art. The VOD Pump 201, located anywhere in the network, is a source of video signal. Clear video is transported over Ethernet 251 to the Encryption Capable QAM 202, located at the network edge. The Encryption Capable QAM 202 encrypts the video data before encoding it for transmission over HFC 252. There are two significant problems with this scenario. The first problem is that Encryption Capable QAMs 202 are expensive, therefore cost reduction is desired. Furthermore, QAMs are shared and it is not necessary to encrypt all content at the edge. The second problem is the transport of high-value content in an unencrypted format 251 is a liability.

Figure 3:
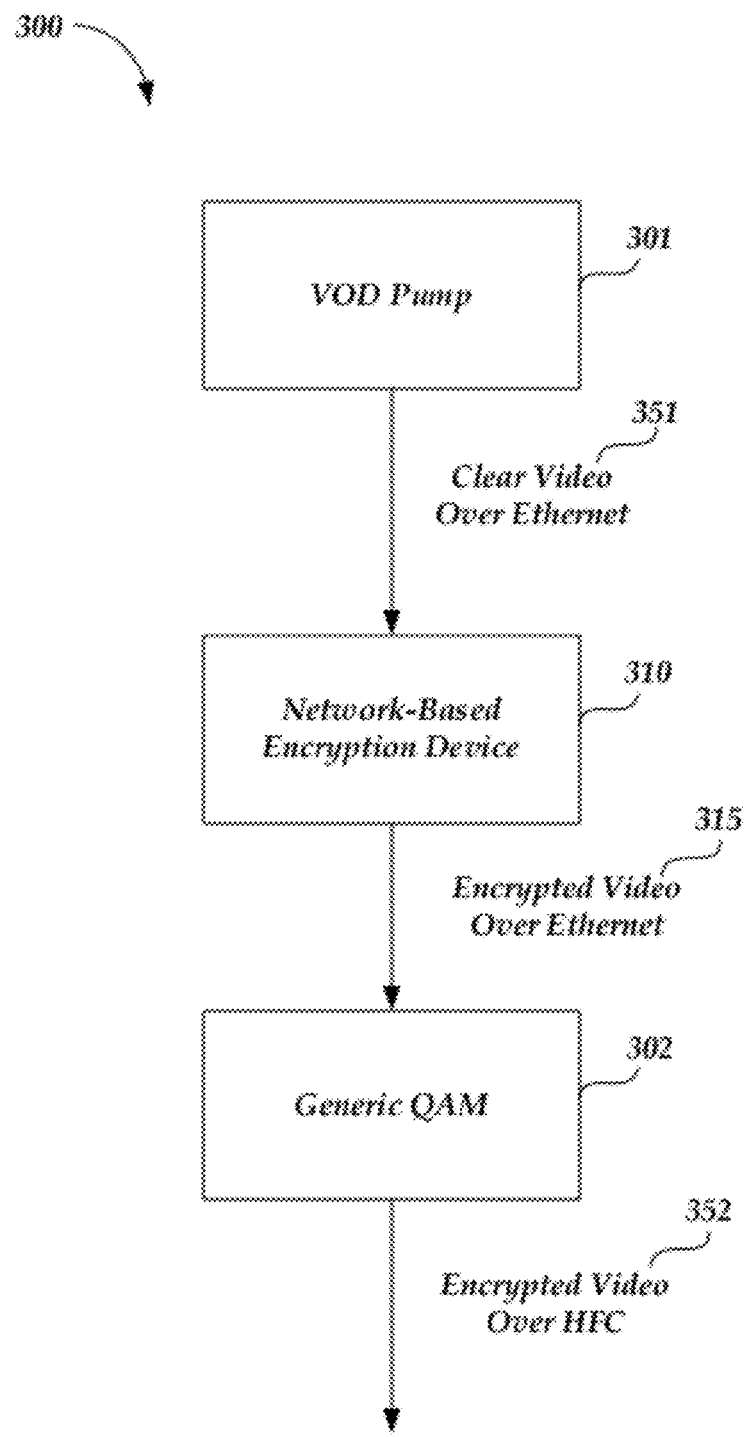
FIG. 3 illustrates the encryption of video data using a network-based encryption device in accordance with the prior art.

FIG. 3 illustrates the encryption of video data using a network-based encryption device 300 in accordance with the prior art. The clear video over Ethernet 351 is now transported from the VOD Pump 301 to a network-based encryption device 310, located at system level. The encrypted video data is transported over Ethernet 352 to the Generic QAM 302. Problem 1 above was solved by addition of a network-based encryption device 310, and replacing the Encryption Capable QAM 202 (see FIG. 2) with a Generic QAM 302. Problem 2 is still not solved with this scenario.

The session resource manager has little knowledge about the encryption. The headend controller is either communicating with the encryption capable QAM (see FIG. 2) or the network-based encryption device 310, dynamically or statically, to setup encryption. When content arrives, the bits are encrypted using the encryption keys. When the network based encryption device 310 is used, the content is Ethernet in/Ethernet out 351/315, instead of the content being QAM RF out.

Accordingly, the first step was to provide some encryption into the edge QAM. Historically, most VOD pumps have been disposed at the edge. However, some VOD pumps have been place further away from the edge, e.g., in library servers. Edge devices take the content and provides the content to the QAM. The edge QAM encrypts the content and the encrypted content is modulated over the remaining network to the subscribers. Even though all of the people that have access to the unencrypted content are in theory employees, more people have access to this unencrypted content and that has raised some concerns.

Figure 4:
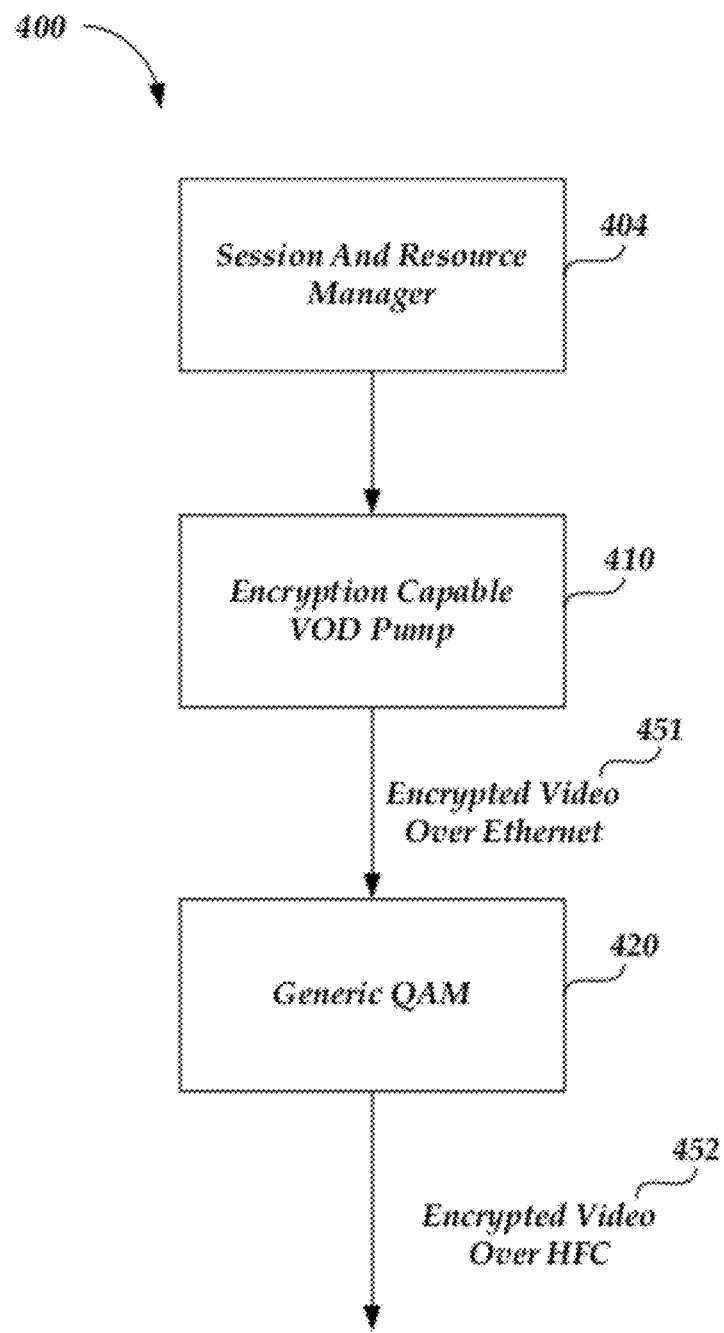
FIG. 4 illustrates the Encryption Capable VOD Pump in a CATV system in accordance to an embodiment.

FIG. 4 illustrates the Encryption Capable VOD Pump in a CATV system 400 in accordance with a first embodiment. Integrating the encryption back to the VOD pump 410 means generic QAMs 420 may be used for encoding signals forwarded to the STB of the subscriber. This eliminates the possibility of a single point of failure. For example, encryption is built into the streaming so if something goes wrong with that VOD pump 410 requiring a reset, the encryption may be reset at the same time. In addition, encrypted video 451 is provided directly to a generic QAM 420 so that clear (unscrambled) video content is not transported in the open, e.g. over Ethernet, thereby solving the security issue. As a result, the first and second problems discussed above are resolved thereby providing the benefits that are desirable to network providers.

The key exchange between the conditional access systems (CAS) and the VOD pump 410 are handled by the session and resource manager. The session and resource manager 404 communicates with the VOD pump 410 to instruct the VOD pump 410 what content to stream out. The session and resource manager 404 now has a new connection to the headend controller. Instead of the headend controller talking to either the QAM 420 or the network-based encryption device, the headend controller communicates with the session and resource manager 404 to negotiate the encryption keys. The session and resource manager 404 then hands over those keys with or as part of the metadata. The encryption capable VOD pump 410 then streams out encrypted content 451.

Bringing the encryption into the VOD pump 410, especially as the VOD pump 410 is placed further and further away from the edge, means the content is crossing multiple headend controllers and there may be multiple key domains. One VOD pump 410 could be delivering content to two different systems that have two completely different key domains. In contrast, the network based encryption devices and QAMs 420 have always been associated directly with the headend controller that services a VOD pump 410 or edge devices. Thus, the session and resource manager 404 needs to be able to have knowledge of each of the headend controllers and be able to deliver the right keys for that streaming session. The head end controller has a predetermined process to randomly choose a key that the headend controller communicates both to the session and resource manager 404 and to the set-top box. Encryption keys are provided to the session and resource manager 404 and decryption keys are provided to the set-top box. In some cases, the set-top boxes are pre-staged with decryption keys. The session and resource manager 404 maintains the encryption keys that the set-top box uses to decrypt encrypted content.

Figure 5:
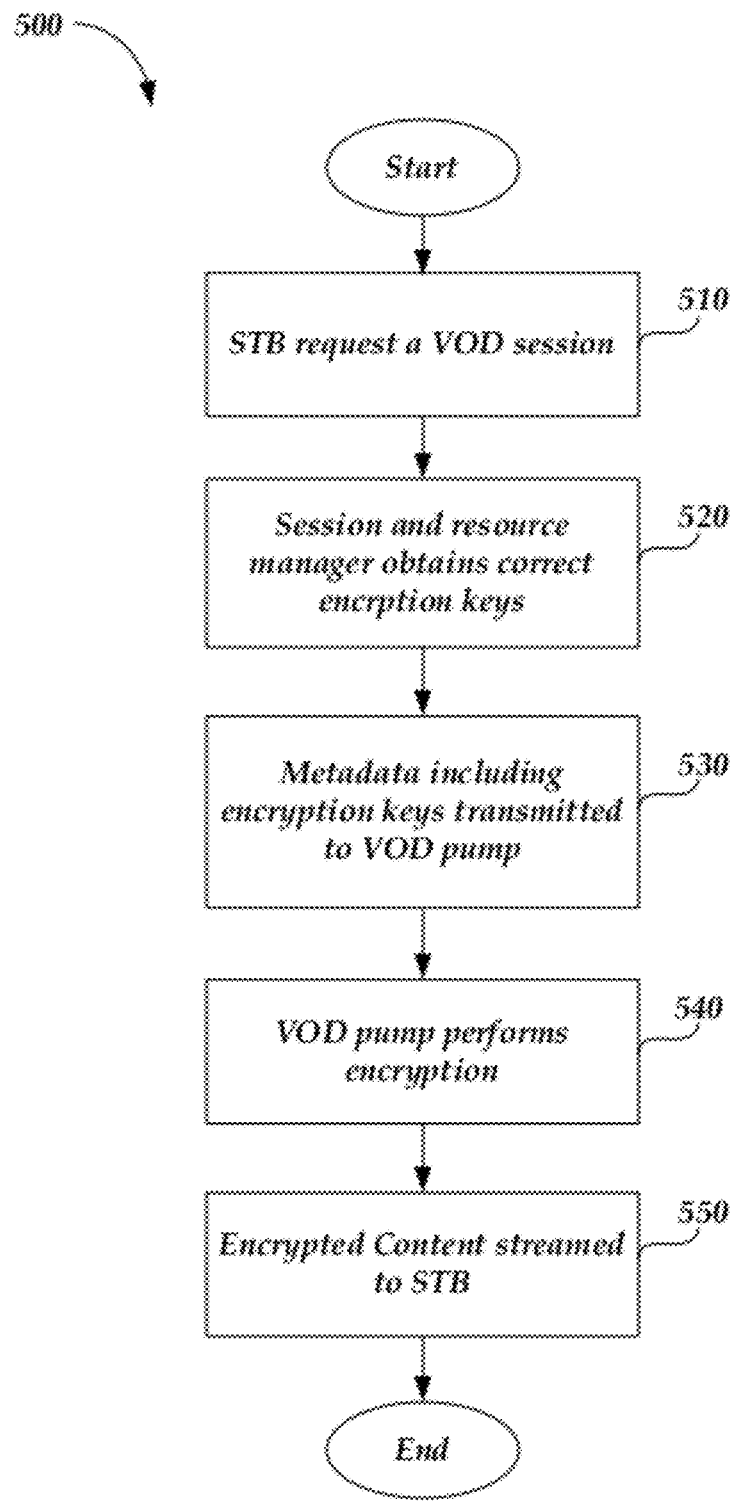
FIG. 5 is a flowchart of a method for providing session based encryption from a video pump according to an embodiment.

FIG. 5 is a flowchart of a method for providing session based encryption from a video pump 500 according to an embodiment of the present invention. The set top box communicates with the session and resource manager to set up a VOD session 510. The session and resource manager then communicates with at least one of a plurality of headend controllers corresponding to that set-top box to obtain the correct encryption keys 520. The session and resource manager then communicates to the VOD pump that it needs to stream out a certain piece of content and metadata that is encrypted using the encryption keys 530. The encryption capable VOD pump performs the encryption 540, and streams the encrypted content out to the target set top box 550.

Figure 6:
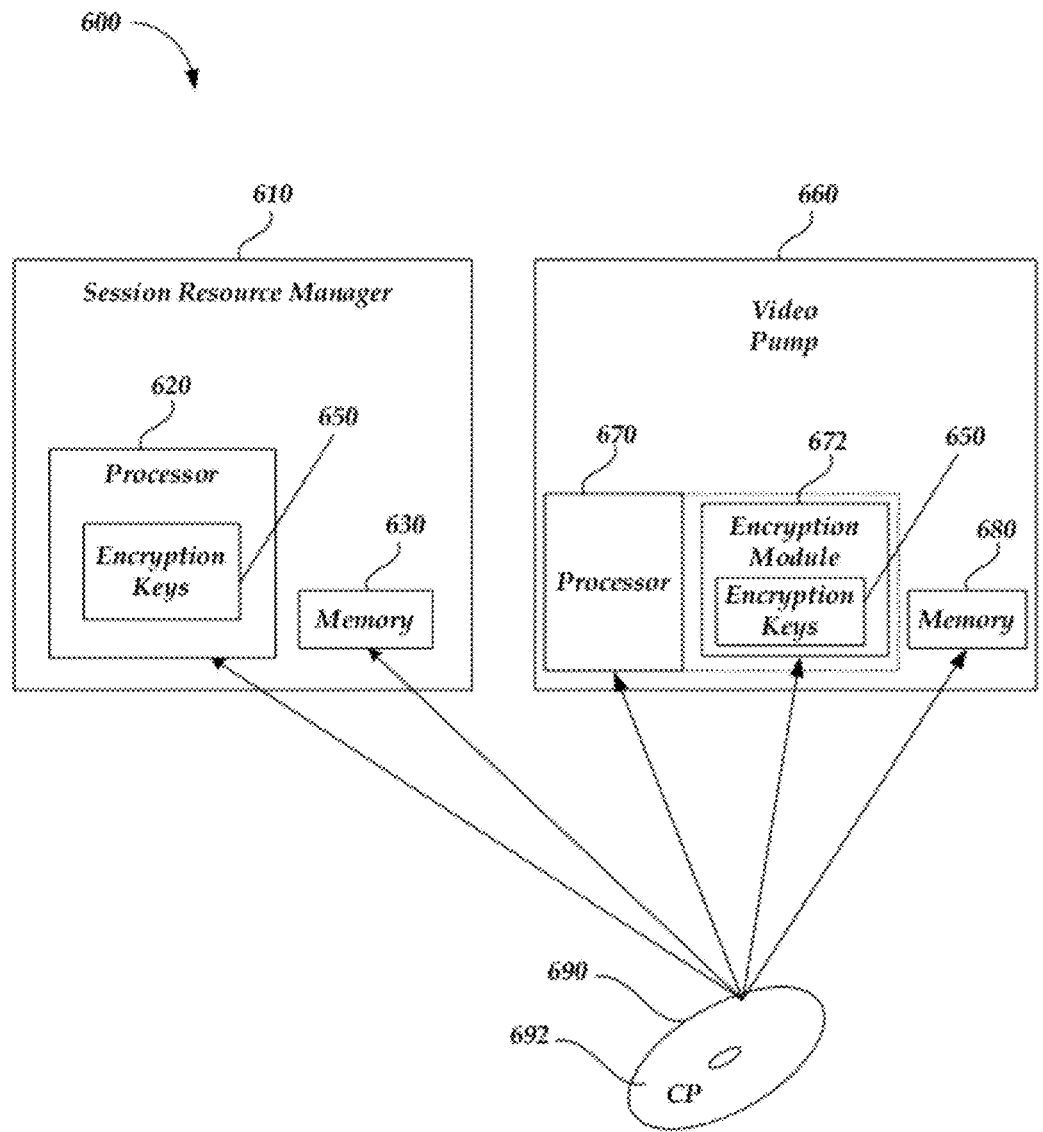
FIG. 6 illustrates a suitable computing environment for implementing a system as described above in FIGS. 1-5 according to an embodiment.

FIG. 6 illustrates a suitable computing environment 600 for implementing a system as described above in FIGS. 1-5 according to an embodiment. In FIG. 6, a session and resource manager 610 includes a processor 620 and memory 630. FIG. 6 also shows a video pump 660, which may include a processor 670, memory 680, and an encryption module 672.

Those skilled in the art will recognize that the session and resource manager 610 may be implemented as a stand-alone device or as part of a headend module. The session resource manager 610 may also be combined with other data/content control devices.

In addition, those skilled in the art will recognize that the processor 670 of the video pump 660 may be configured with instruction to implement the encryption functions. Thus, the encryption module 672 may a separate module or may represent only a subset of functions performed by the processor 670. Moreover, as with the session and resource manager 610, the video pump 660 may be implemented as a stand-alone device, as part of a headend module, as part of the session and resource manager 610 or as part of other data/content control devices.

Embodiments may also be implemented in combination with other types of computer systems and program modules. Generally, program modules include routines, programs, components, data structures, and other types of structures that perform particular tasks or implement particular abstract data types. By way of example, computer readable media 690 can include computer storage media or other tangible media. Computer storage media 690 includes volatile and nonvolatile, removable and non-removable media implemented in any method or technology for storage of information 692, such as computer readable instructions, data structures, program modules or other data. Moreover, those skilled in the art will appreciate that the invention may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable media 690 may refer to a mass storage device, such as a hard disk or CD-ROM drive. However, it should be appreciated by those skilled in the art that tangible computer-readable media can be any available media that can be accessed or utilized by a processing device, e.g., server or communications network provider infrastructure.

By way of example, and not limitation, computer-readable media 690 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processing devices 620, 670 may be configured to execute instructions that perform the operations of embodiments of the present invention.

It should also be appreciated that various embodiments of the present invention can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Memory 630, 680 thus may store the computer-executable instructions that, when executed by processors 620, 670, cause the processors 620, 670 to implement the functions of the session and resource manager 610 and the video pump 660, respectively, according to an embodiment as described above with reference to FIGS. 1-5. Memory 630, 680 may also be used to maintain the keys 650 provided by the headend controller.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A session and resource manager, comprising:
memory for storing data; and
a processor, coupled to the memory, for processing data;
wherein the processor is configured to obtain from a headend controller encryption keys utilized for encrypting content, the processor being configured to identify each of a plurality of headend controllers serviced by a video pump, determine appropriate encryption keys for each of a plurality of streaming sessions to ensure encrypted content is delivered to a set-top box using the appropriate encryption key, forward at least one set of obtained keys to the video pump and instruct the video pump to encrypt content such that the content is encrypted at a source of the content, wherein the video pump encrypts the content at a source of the content, the video pump encrypting the content prior to transmission from the source of the content, through a headend, and to a set-top box, and forward the encrypted content to a modulation device for modulating the encrypted content for delivery to the set-top box, wherein the set-top box decrypts the encrypted content by decryption keys received from the headend controller.

2. The session and resource manager of claim 1, wherein the processor identifies the set-top box requesting the content and sets up a VOD session for the identified set-top box.

3. The session and resource manager of claim 1, wherein the processor obtains the encryption keys from the headend controller by negotiating encryption keys from the headend controller for encrypting the requested content.

4. The session and resource manager of claim 1, wherein the encrypted content includes metadata associated with the requested content.

5. The session and resource manager of claim 1, wherein the processor communicates with the set-top box to provide keys for decrypting the requested content.

6. A video pump, comprising:
memory for storing content; and
a processor, coupled to the memory, for processing data;
wherein the processor is configured to identify each of a plurality of headend controllers serviced by a video pump, determine appropriate encryption keys for each of a plurality of streaming sessions to ensure encrypted content is delivered to a set-top box using the appropriate encryption key, receive encryption keys from at least one of the headend controller and that are associated with a video session, and to encrypt content associated with the video session using the received encryption keys such that the content is encrypted at a source of the content, wherein the video pump encrypts the content at a source of the content, the video pump encrypting the content prior to transmission from the source of the content, through a headend, and to a set-top box, and forward the encrypted content to a modulation device for modulating the encrypted content for delivery to the set-top box, wherein the set-top box decrypts the encrypted content by decryption keys received from the headend controller.

7. The video pump of claim 6, wherein the processor detects a failure of the video pump, resets, and begins re-encryption of content to be streamed.

8. The video pump of claim 6, wherein the processor re-encrypts content by receiving new encryption keys for encrypting the content and re-encrypting the content using the new encryption keys.

9. The video pump of claim 6, wherein processor encrypts content to prevent unscrambled content from being transmitted anywhere along a delivery path to a set-top box requesting the setup of the video session.

10. The video pump of claim 6, wherein the processor streams encrypted content to a plurality of headend controllers representing multiple domains.

11. A system for providing session based encrypted content from a video pump, comprising:
   a plurality of headend controllers, at least one headend controller for receiving a request from a set-top box via a hybrid fiber coax (HFC) network for establishing a video session for delivering requested content, the at least one headend controller managing data sent to and received from the set-top box via the HFC network, the at least one headend controller providing the set-top box decryption keys;
   a session and resource manager, coupled to the at least one headend controller, for identifying the at least one headend controller, obtaining the encryption keys from the at least one headend controller, the encryption keys utilized for encrypting content requested by the set-top box;
   a video pump, coupled to the session and resource manager, for receiving the obtained encryption keys associated with a video session and for encrypting the requested content associated with the video session using the received encryption keys such that the content is encrypted at a source of the content, wherein the video pump encrypts the content at a source of the content the video pump encrypting the content prior to transmission from the source of the content, through a headend, and to a set-top box; and
   a generic modulation device, for receiving the encrypted content from the video pump and for modulating the encrypted content for delivery to the set-top box via the HFC network, wherein the set-top box uses the decryption keys to decrypt the encrypted content.

12. The system of claim 11, wherein the generic modulation device is a generic quadrature amplitude modulation (QAM) device.

13. The system of claim 11, wherein the session and resource manager identifies the set-top box requesting the content and sets up a VOD session for the identified set-top box.

14. The system of claim 11, wherein the session and resource manager obtains the encryption keys from the headend controller by negotiating encryption keys from the headend controller for encrypting the requested content.

15. The system of claim 14, wherein the encrypted content includes metadata associated with the requested content.

16. The system of claim 11, wherein the session and resource manager communicates with the set-top box to provide keys for decrypting the requested content.

17. The system of claim 16, wherein the session and resource manager detects a failure of the video pump, resets the video pump, and initiates re-encryption by the video pump of content to be streamed.

18. The system of claim 17, wherein the session and resource manager obtains new encryption keys for re-encrypting the content, and wherein the video pump re-encrypts the content using the new encryption keys obtained by the session and resource manager.

19. The system of claim 11, wherein the video pump encrypts content to prevent unscrambled content from being transmitted anywhere along a delivery path to a set-top box requesting the setup of the video session.

20. The system of claim 11, wherein the video pump streams encrypted content to a plurality of headend controllers representing multiple domains.

21. A method for providing session based encrypted content from a video pump, comprising:
   communicating, by a session and resource manager with at least one of a plurality of headend controllers, to identify the at least one of a plurality of headend controllers, and determine and obtain encryption keys for content requested by a set-top box;
   forwarding, to a video pump, the obtained encryption keys for the content requested by the set-top box; and
   providing, to the video pump, an instruction for the video pump to obtain the requested content, to encrypt the requested content using the obtained encryption keys provided by the session and resource manager such that the content is encrypted at a source of the content, wherein the video pump encrypts the content at a source of the content, the video pump encrypting the content prior to transmission from the source of the content, through a headend, and to a set-top box, and forward the content encrypted using the obtained encryption keys to a modulation device for modulating the encrypted content for streaming the content encrypted using the obtained encryption keys to the set-top box requesting the content, wherein the set-top box decrypts the encrypted content by decryption keys received from the at least one of a plurality of headend controllers.

22. The method of claim 21 further comprising receiving at the session and resource manager a request from the set-top box to setup a video-on-demand (VOD) session and identifying content to be sent to the set-top box.

23. A computer readable storage device including executable instructions which, when executed by a processor, provides session based encrypted content from a video pump, by:
   communicating, by a session and resource manager with at least one of a plurality of headend controllers, to identify the at least one of a plurality of headend controllers, and determine and obtain encryption keys for content requested by a set-top box;
   forwarding, to a video pump, the obtained encryption keys for the content requested by the set-top box; and
   providing, to the video pump, an instruction for the video pump to obtain the requested content, to encrypt the requested content using the obtained encryption keys provided by the session and resource manager such that the content is encrypted at a source of the content, wherein the video pump encrypts the content at a source of the content, the video pump encrypting the content prior to transmission from the source of the content, through a headend, and to a set-top box, and forward the content encrypted using the obtained encryption keys to a modulation device for modulating the encrypted content for streaming the content encrypted using the obtained encryption keys to the set-top box requesting the content, wherein the set-top box decrypts the encrypted content by decryption keys received from the at least one of a plurality of headend controller controllers.

24. The computer readable storage device of claim 23 further comprising receiving at the session and resource manager a request from the set-top box to setup a video-on-demand (VOD) session and identifying content to be sent to the set-top box.

25. The computer readable storage device of claim 23, wherein the session and resource manager detects a failure of the video pump, resets the video pump, and initiates re-encryption by the video pump of content to be streamed.

* * * * *